US011729075B1

(12) United States Patent
Qu et al.

(10) Patent No.: US 11,729,075 B1
(45) Date of Patent: Aug. 15, 2023

(54) TIME SERIES DATA COLLECTION FOR A NETWORK MANAGEMENT SYSTEM

(71) Applicant: Juniper Networks, Inc., Sunnyvale, CA (US)

(72) Inventors: Diheng Qu, Palo Alto, CA (US); Atul Bhaskarrao Patil, San Ramon, CA (US); Rajeev Menon Kadekuzhi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/657,504

(22) Filed: Mar. 31, 2022

(51) Int. Cl.
*H04L 43/08* (2022.01)
*H04L 45/02* (2022.01)

(52) U.S. Cl.
CPC .............. *H04L 43/08* (2013.01); *H04L 45/02* (2013.01)

(58) Field of Classification Search
CPC ....................................................... H04L 43/08
See application file for complete search history.

(56) References Cited

U.S. PATENT DOCUMENTS

| 10,200,248 B1 | 2/2019 | Jiang et al. |
| 10,516,761 B1 | 12/2019 | A et al. |
| 10,992,543 B1* | 4/2021 | Rachamadugu ........ H04L 43/04 |
| 10,997,247 B1* | 5/2021 | Harris ................... G06F 16/128 |
| 10,999,410 B1 | 5/2021 | A et al. |
| 2005/0038818 A1* | 2/2005 | Hooks ................... G06F 21/577 |
| 2017/0155557 A1 | 6/2017 | Desai et al. |
| 2017/0317908 A1* | 11/2017 | Jose ........................ H04L 43/10 |
| 2018/0365336 A1 | 12/2018 | Raghavendra et al. |

OTHER PUBLICATIONS

"Intent-Based Analytics," Apstra, 4.0 documentation, Aug. 14, 2021, Retrieved Oct. 18, 2021 from: https://www.uniper.net/documentation/us/en/software/apstra/apstra4.0.0/, 1 pp.
"Time Voyager," Apstra, 3.3.0 documentation, Nov. 10, 2021, Retrieved from the Internet: URL: https://www.uniper.net/documentation/us/en/software/apstra/apstra3.3.0/bp_rollback.html#listing-blueprint-revisions, 4 pp.
Bjorklund, "YANG—A Data Modeling Language for the Network Configuration Protocol (NETCONF)," Internet Engineering Task Force (IETF), RFC 6020, Oct. 2010, 173 pp.

(Continued)

*Primary Examiner* — Viet D Vu
(74) *Attorney, Agent, or Firm* — Shumaker & Sieffert, P.A.

(57) ABSTRACT

A controller device includes a memory and one or more processors coupled to the memory. The memory stores instructions that, when executed, cause the one or more processors to receive, from a set of sensor devices, first telemetry data indicating a first set of changes for telemetry parameters that occur during a first time range. The instructions further cause the one or more processors to determine, using the first snapshot and the first telemetry data, a second snapshot that specifies a first complete state at an end of the first time range. The instructions further cause the one or more processors to determine a second complete state of the telemetry parameters for the second time range based on the second snapshot and second telemetry data indicating a second set of changes for the set of telemetry parameters that occur during a second time range.

20 Claims, 9 Drawing Sheets

(56) References Cited

OTHER PUBLICATIONS

Enns, "NETCONF Configuration Protocol," Network Working Group, RFC 4741, Dec. 2006, 95 pp.
Harrington et al., "An Architecture for Describing Simple Network Management Protocol (SNMP) Management Frameworks," Network Working Group, RFC 3411, Dec. 2002, 64 pp.
Extended Search Report from counterpart European Application No. 22180464.4 dated Nov. 24, 2022, 11 pp.

* cited by examiner

TIME SERIES DATA COLLECTION FOR A NETWORK MANAGEMENT SYSTEM

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator (e.g., a network administrator) can easily create and manage these high-level network configuration services.

SUMMARY

In general, this disclosure describes techniques for a collection of telemetry information for managing network devices. A network management system (NMS) device, also referred herein as a controller or controller device, may be configured to translate high-level configuration (e.g., intents received from an administrator for a plurality of managed network devices) to low-level configuration (e.g., to be applied to the managed network devices themselves). In some instances, the controller device may receive an indication of a topology and a role for a resource device and generate device-level configuration information for the resource device. For example, an administrator (e.g., a human being) may select a topology (e.g., spine or leaf, 3-stage Clos, or 5-stage Clos) and role for the resource device and provide an intent. In some examples, the controller device may generate device-level configuration for the resource device based on the role of the resource device, the topology, and the intent.

Collecting telemetry data for a time series database may benefit from high availability (HA) and relatively high bandwidth, processing, and storage capacity, which may result in a high cost. For example, a sensor device may stream telemetry data to a controller device (e.g., a writer implemented by the controller device). The controller device may parse data messages of the streamed telemetry data for storage at a database (DB). The controller device (e.g., a reader implemented by the controller device) may execute a query on the database and return a result. However, as a number of devices streaming telemetry data increases the bandwidth for streaming the telemetry data to the write, the computational burden of parsing the data messages of the streamed telemetry data and the storage of data at the database increases.

For example, event driven telemetry data collection, e.g. collecting interface up/down status only when the interface status changes, provides an option to reduce the amount of telemetry data to be collected and stored in the database. However, one example challenge is to deduce the state of the entity being monitored, e.g. is interface up or down, at a specific time due to the irregularity of the relevant events associated with the entity. Techniques described herein for determining a "snapshot" may represent an example solution to this problem of deduce the state of the entity being monitored. As used herein, a snapshot may provide a complete state of a set of network parameters at a specific time (e.g., when a file storing telemetry data is allocated).

In accordance with the techniques of the disclosure, a controller device may be configured to snapshot telemetry data differently for periodic data (e.g., an interface counter) and event driven data (e.g., interface up/down). Examples of periodic data may include how many bytes have been transmitted and how many errors occurred for an interface. A sensor device (e.g., arranged at a network device or arranged outside of the network device) may generate periodic data periodically (e.g., every five seconds or every minute). In this example, the sensor device may stream the periodic data to the controller device.

Examples of event driven data may include whether an interface is up or down, a failure, a disk input-output (TO) failure, route information, or network failure. For event driven data, the controller device may store the event driven data in response to a change of the event driven data. For example, if the interface has been up for very, very long time the controller device may not log an event. In this example, the controller device may log an event when the interface changes from up to down.

In some examples, the controller device may utilize the intent provided by a network administrator, e.g. a graph model that describes the intended network topology, to preprocess telemetry data collected from network devices. For example, the controller device may determine a filtered set of telemetry parameters from the plurality of telemetry parameters based on the graph model. For instance, in response to determining that the graph model may indicate that 32 interfaces are intended to be operational out of 132, the controller device may monitor only the 32 interfaces intended to be operational. In this way, the controller device may help to ensure that telemetry data relevant to the intent provided by the network administrator is stored in the database, which may help to reduce a processing and storage burden on the controller device.

In some examples, the controller device may add context to telemetry data to aid eventual data analytics processes. For example, the graph model may include service level agreement (SLA) attributes for certain network devices, which can be attached to telemetry data to be saved in the database. The controller device may generate implied telemetry data in the absence of such data from the device. For example, the graph model may indicate that a network switch should have a BGP session with a remote peer. If such session is absent from device telemetry, the controller device may store an event in the database to indicate that the expected BGP session is missing.

The controller device may track a state of all network devices being monitored, e.g. interface up/down, and may choose to store a snapshot of such states in a database either at the predefined interval or based on certain predefined threshold being met, e.g., a number of events being logged since last snapshot. In this way, a reader of the database may restore system state from a snapshot and apply subsequent logged events to update the state incrementally.

In one example, a method for managing a plurality of network devices of a network includes receiving, by one or more processors, from a set of sensor devices for the plurality of network devices, first telemetry data indicating a first set of changes for telemetry parameters that occur during a first time range and storing, by the one or more processors, the first telemetry data and a first snapshot for the set of telemetry parameters for the plurality of network devices. The method further includes determining, by one or more processors, using the first snapshot and the first telemetry data, a second snapshot for the set of telemetry parameters that specifies a first complete state of the telemetry parameters at an end of the first time range and storing, by the one or more processors, the second snapshot and second telemetry data indicating a second set of changes for the set of telemetry parameters that occur during a second time range. The method further includes, in response to a request for telemetry information associated with the second time range, determining, by the one or more processors, a second complete state of the telemetry parameters for the second time range based on the second snapshot and the second telemetry data and outputting, by the one or more processors, the second complete state of the telemetry parameters.

In another example, a controller device includes a memory and one or more processors coupled to the memory. The memory stores instructions that, when executed, cause the one or more processors to receive, from a set of sensor devices for a plurality of network devices, first telemetry data indicating a first set of changes for telemetry parameters that occur during a first time range and store the first telemetry data and a first snapshot for the set of telemetry parameters for the plurality of network devices. The instructions further cause the one or more processors to determine, using the first snapshot and the first telemetry data, a second snapshot for the set of telemetry parameters that specifies a first complete state of the telemetry parameters at an end of the first time range and store the second snapshot and second telemetry data indicating a second set of changes for the set of telemetry parameters that occur during a second time range. The instructions further cause the one or more processors to, in response to a request for telemetry information associated with the second time range, determine a second complete state of the telemetry parameters for the second time range based on the second snapshot and the second telemetry data and output the second complete state of the telemetry parameters.

In one example, a computer-readable storage medium having stored thereon instructions that, when executed, cause a processor of a controller device that manages a plurality of network devices to receive, from a set of sensor devices for a plurality of network devices, first telemetry data indicating a first set of changes for telemetry parameters that occur during a first time range and store the first telemetry data and a first snapshot for the set of telemetry parameters for the plurality of network devices. The instructions further cause the processor to determine, using the first snapshot and the first telemetry data, a second snapshot for the set of telemetry parameters that specifies a first complete state of the telemetry parameters at an end of the first time range and store the second snapshot and second telemetry data indicating a second set of changes for the set of telemetry parameters that occur during a second time range. The instructions further cause the processor to, in response to a request for telemetry information associated with the second time range, determine a second complete state of the telemetry parameters for the second time range based on the second snapshot and the second telemetry data, and output the second complete state of the telemetry parameters.

The details of one or more examples are set forth in the accompanying drawings and the description below. Other features, objects, and advantages will be apparent from the description and drawings, and from the claims.

DETAILED DESCRIPTION

Figure 1:
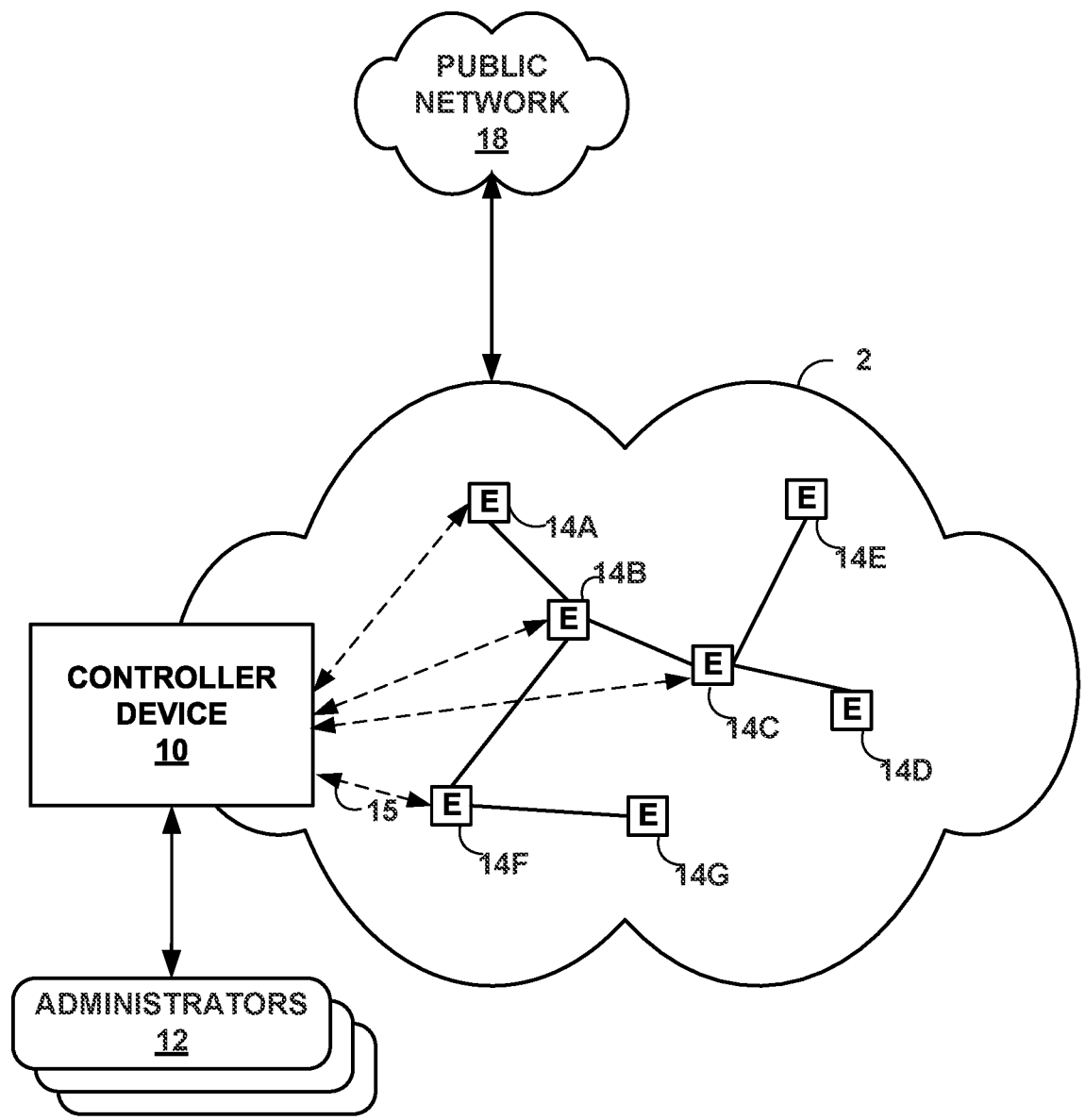
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10 may comprise, for example, a cluster of virtual machines. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12 uses controller device 10 to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Controller device 10, also referred to herein as a network management system (NMS) or NMS device, and elements 14 are centrally maintained by an IT group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrator 12 uses controller device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference. Controller device 10 may establish NETCONF sessions with one or more of elements 14.

A user configuration of devices may be referred to as "intents." An intent-based networking system may help to allow administrators to describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When intents are modeled using a unified graph model, extending new intent support needs to extend the graph model and compilation logic.

Controller device 10 may be configured to accept high-level configuration data, or intents, from administrator 12 (which may be expressed as structured input parameters, e.g., according to YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020).

In order to configure devices to perform the intents, a user (such as an administrator 12) may write translation programs that translate high-level configuration instructions (e.g., instructions according to an intent data model, which may be expressed as a unified graph model) to low-level configuration instructions (e.g., instructions according to a device configuration model). As part of configuration service support, administrator 12 may provide the intent data model and a mapping between the intent data model to a device configuration model.

Controller device 10 may also be configured to output respective sets of low-level device configuration data, e.g., device configuration additions, modifications, and removals. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198, 657, filed Jun. 30, 2016, the entire contents of which are hereby incorporated by reference. This disclosure refers to low-level device configuration produced from intents (e.g., produced by compiling or translating the intents) as "device-level intent configuration information" or "intent configuration," to distinguish this device-level configuration from out of band (OOB) device-level configuration. In some examples, controller device 10 may use YANG modeling for an intent data model and low-level device configuration models. This data may contain relations across YANG entities, such as list items and containers. In some examples, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the intent data model. Controller device 10 may be configured to use the same compilation logic for each of create, update, and delete as applied to the graph model.

In general, controllers like controller device 10 may use a hierarchical data model for intents, low-level data models, and resources. The hierarchical data model can be based on YANG or YAML. The hierarchical data model can be represented as a graph, as discussed above. Use of intents may ease the management of networks and intents are declarative. To realize intents, controller device 10 may attempt to select optimal resources from elements 14 and/or from other devices.

In general, controller device 10 may be configured to translate a high-level configuration (e.g., intents received from an administrator for a plurality of managed network devices) to low-level configuration, which may also be referred to herein as "device-level configuration" (to be applied to the managed network devices themselves). In some instances, controller device 10 may receive an indication of a topology and a role for element 14A and generate device-level configuration information for element 14A. For example, administrator 12 may select a topology and role for element 14A and provide an intent. In some examples, controller device 10 may generate device-level configuration for element 14A based on the role (e.g., spine or leaf) of element 14A in the topology (e.g., a spine and leaf topology), the topology, and the intent.

In accordance with the techniques of the disclosure, controller device 10 may be configured to snapshot telemetry data differently for periodic data (e.g., an interface counter) and event driven data (e.g., interface up/down). Examples of periodic data may include how many bytes have been transmitted and how many errors occurred for an interface. Sensor devices arranged at elements 14 may periodically generate periodic data (e.g., every five seconds or every minute). In this example, each sensor device may stream the periodic data to controller device 10. Examples of event driven telemetry data may include whether an interface is up or down, a failure, a disk input-output (IO) failure, routing information, or network failure information. For event driven telemetry data, controller device 10 may store the event driven telemetry data in response to a change of the event driven data. For example, if the interface has been up for very, very long time controller device 10 may not log an event. In this example, controller device 10 may log an event when the interface goes down.

For example, controller device 10 may receive, from a set of sensor devices for elements 14, first telemetry data indicating a first set of changes for telemetry parameters that occur during a first time range (e.g., an hour period). For instance, controller device 10 may receive an indication that an interface on element 14A has changed from up to down without including information on a state of interfaces that have not changed (e.g., no event has occurred). Controller device 10 may store the first telemetry data in a first file that comprises a first snapshot for the set of telemetry parameters for the plurality of network devices. For instance, controller device 10 may store a bit '0' as a value for the interface on element 14A in a data unit of the first file, where the first file includes a snapshot that stores a bit '1' for the interface on element 14A.

In this example, controller device 10 may determine, using the first snapshot and the first telemetry data, a second snapshot for the set of telemetry parameters that specifies a first complete state of the telemetry parameters at an end of the first time range. For example, controller device 10 may apply the first set of changes indicated in the first telemetry data (and other changes indicated in additional telemetry data) to the first snapshot to generate the second snapshot. For instance, controller device 10 may determine the interface of element 14A is down when the first snapshot indicates that interface element 14A is up and the first telemetry data indicates that the interface on element 14A changed from up to down. In this instance, controller device 10 may determine that a second interface of element 14A is up when the first snapshot indicates that interface element 14A is up and the first file and/or a first set of data units does not include telemetry data that indicates a change on the second interface of element 14A.

Controller device 10 may store, in a second file and/or second set of data units, the second snapshot and second telemetry data indicating a second set of changes for the set of telemetry parameters that occur during a second time range. For instance, controller device 10 may store a bit '0' or '1' as a value for each interface on element 14A in a snapshot of the second file and store a bit '0' as a value for an interface on element 14A that has changed from up to down in a data unit of the second file without including information on a state of interfaces that have not changed (e.g., no event has occurred) during the second time range.

In response to a request for telemetry information associated with the second time range, controller device 10 may determine a second complete state of the telemetry parameters for the time range based on the second snapshot stored in the second file and the second telemetry data stored in the second file. For instance, controller device 10 may determine a first interface of element 14A is down at the end of the second time range when the second snapshot indicates that interface element 14A is up and the second telemetry data indicates that the first interface on element 14A changed from up to down and that a second interface of element 14A is up when the second snapshot indicates that interface element 14A is up and the first telemetry data does not indicate a change on the second interface of element 14A. In this example, controller device 10 may output the second complete state of the telemetry parameters. For example, controller device 10 may output an indication of the second complete state of the telemetry parameters for display to administrator 12.

In some examples, controller device 10 may utilize an intent provided by administrator 12, e.g. a graph model that describes the intended network topology, to preprocess telemetry data collected from network devices. For example, controller device 12 may determine a filtered set of telemetry parameters from the plurality of telemetry parameters based on the graph model. For instance, in response to determining that the graph model may indicate that 32 interfaces are intended to be operational out of 132, controller device 10 may cause sensor devices for elements 14 to stream telemetry data for only the 32 interfaces intended to be operational. In this way, controller device 10 may help to ensure that telemetry data relevant to the intent provided by administrator 12 is stored in a database, which may help to reduce a processing and storage burden on controller device 10.

Figure 2:
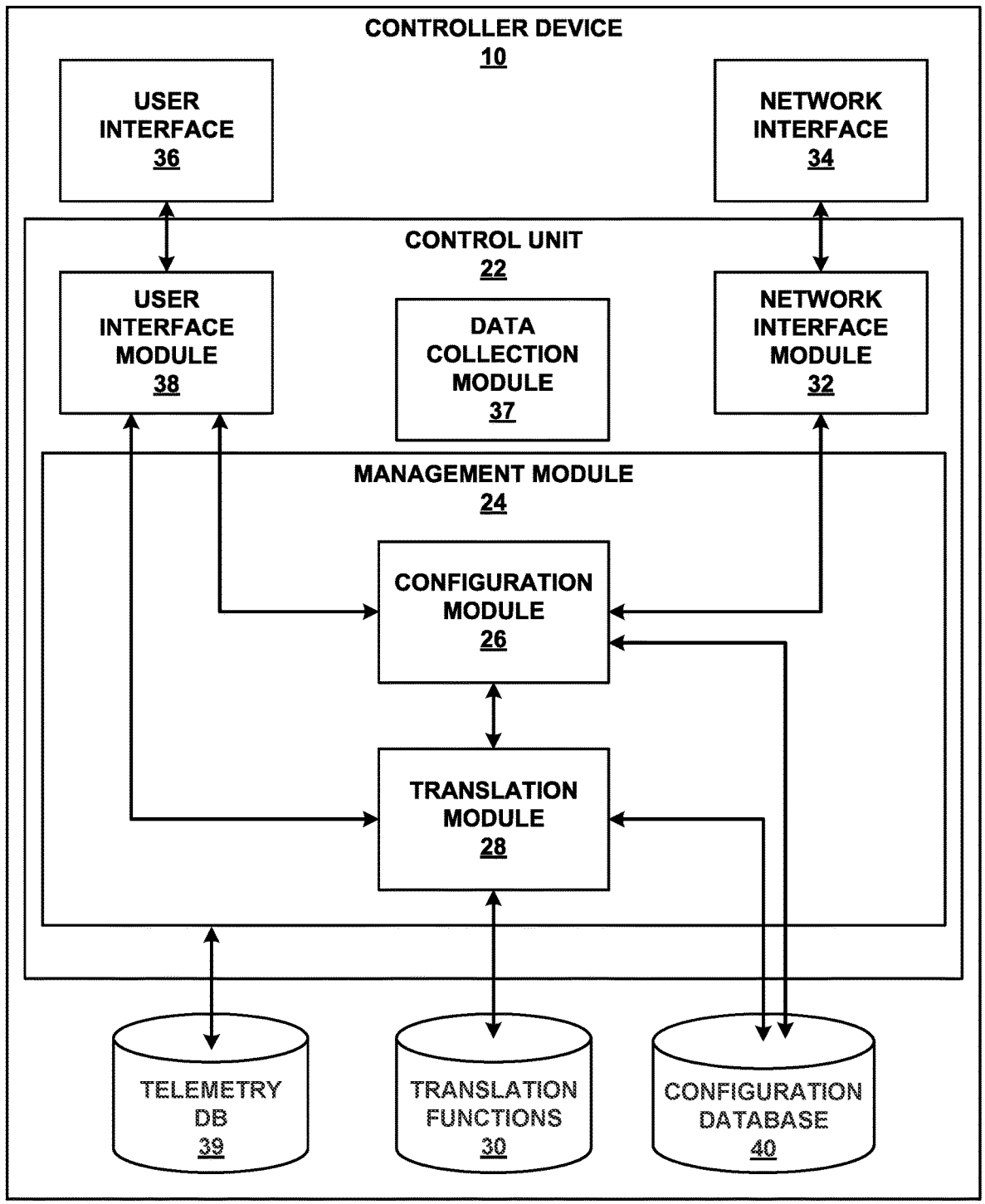
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive an intent (e.g., a high-level configuration instruction) for a set of managed network devices from a user, such as administrator 12. In some examples, management module 24 may be referred to herein as a "fabric manager." Over time, the user may update the configuration instructions, e.g., to add new services, remove existing services, or modify existing services performed by the managed devices. The intents may be structured according to, e.g., YANG. In some examples, management module 24 also provides the user with the ability to submit translation functions that translation module 28 executes to transform intents to device-specific, low-level configuration instructions, as discussed below.

Controller device 10 also includes configuration database 40. Configuration database 40 may include a data structure describing managed network devices, e.g., network elements 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 may store current configuration information (e.g., intent data model, or in some cases, both intent data model and low-level configuration information) for the managed devices (e.g., network elements 14). Configuration database 40 may include a database that comprises a unified intent data model.

Management module 24 may maintain a data structure in configuration database 40. The data structure may include a plurality of vertices and a plurality of edges, each vertex of the plurality of vertices representing a respective network device of a plurality of network devices (e.g., network elements 14) or a respective stateless intent of a plurality of stateless intents, and the plurality of edges defining relationships between the plurality of vertices. Management module 24 may receive an indication of a stateful intent. For example, management module 24 may receive intent unified-graph-modeled configuration data for a set of managed network devices from a user, such as administrator 12.

Translation module 28, which may also be referred to herein as a "device manager," may determine which devices are managed using configuration database 40. Translation module 28 determines which of translation functions 30 to execute on the high-level configuration instructions based on the information of configuration database 40, e.g., which of the devices are to receive the low-level configuration instructions. Translation module 28 then executes each of the determined translation functions of translation functions 30, providing the high-level configuration instructions to the translation functions as input and receiving low-level configuration instructions. Translation module 28 may then provide the low-level configuration instructions to configuration module 26.

After receiving the low-level configuration instructions from translation module 28, configuration module 26 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example of allowing administrator 12 (FIG. 1) to interact with controller device 10, other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

In accordance with the techniques of the disclosure, data collection module 37, which may comprise a writer and/or a reader, may be configured to snapshot telemetry data differently for periodic data (e.g., an interface counter) and event driven data (e.g., interface up/down). For example, data collection module 37 may receive, from a set of sensor devices for elements 14, first telemetry data indicating a first set of changes for telemetry parameters that occur during a first time range (e.g., an hour period). For instance, data collection module 37 may receive an indication that an interface on element 14A has changed from up to down without including information on a state of interfaces that have not changed (e.g., no event has occurred). Data collection module 37 may store the first telemetry data in a first file in telemetry database (DB) 39 that comprises a first snapshot for the set of telemetry parameters for the plurality of network devices. For instance, data collection module 37 may store a bit '0' as a value for the interface on element 14A in a data unit of the first file in telemetry database 39, where the first file includes a snapshot that stores a bit '1' for the interface on element 14A.

In this example, data collection module 37 may determine, using the first snapshot and the first telemetry data, a second snapshot for the set of telemetry parameters that specifies a first complete state of the telemetry parameters at an end of the first time range. For example, data collection module 37 may apply the first set of changes indicated in the first telemetry data (and other changes indicated in additional telemetry data) to the first snapshot to generate the second snapshot. For instance, data collection module 37 may determine the interface of element 14A is down when the first snapshot indicates that interface element 14A is up and the first telemetry data indicates that the interface on element 14A changed from up to down. In this instance, data collection module 37 may determine that a second interface of element 14A is up when the first snapshot indicates that interface element 14A is up and the first file does not include telemetry data that indicates a change on the second interface of element 14A.

Data collection module 37 may store, in a second file in telemetry database 39, the second snapshot and second telemetry data indicating a second set of changes for the set of telemetry parameters that occur during a second time range. For instance, data collection module 37 may store a bit '0' or '1' as a value for each interface on element 14A in a snapshot of the second file in telemetry database 39 and store a bit '0' as a value for an interface on element 14A that has changed from up to down in a data unit of the second file of telemetry database 39 without including information on a state of interfaces that have not changed (e.g., no event has occurred) during the second time range.

In response to a request for telemetry information associated with the second time range, a reader of data collection module 37 may determine a second complete state of the telemetry parameters for the time range based on the second snapshot stored in the second file of telemetry database 39 and the second telemetry data stored in the second file of telemetry database 39. For instance, data collection module 37 may determine a first interface of element 14A is down at the end of the second time range when the second snapshot indicates that interface element 14A is up and the second telemetry data indicates that the first interface on element 14A changed from up to down and that a second interface of element 14A is up when the second snapshot indicates that interface element 14A is up and the first telemetry data does not indicate a change on the second interface of element 14A. In this example, data collection module 37 may output the second complete state of the telemetry parameters. For example, data collection module 37 may output an indication of the second complete state of the telemetry parameters for display to administrator 12.

In some examples, data collection module 37 may utilize an intent provided by administrator 12, e.g. a graph model that describes the intended network topology, to preprocess telemetry data collected from network devices. For example, data collection module 37 may determine a filtered set of telemetry parameters from the plurality of telemetry parameters based on the graph model. For instance, in response to determining that the graph model stored in configuration database 40 may indicate that 32 interfaces are intended to be operational out of 132, data collection module 37 may cause sensor devices for elements 14 to stream telemetry data for only the 32 interfaces intended to be operational. In this way, controller device 10 may help to ensure that telemetry data relevant to the intent provided by administrator 12 is stored in a database, which may help to reduce a processing and storage burden on controller device 10.

Figure 3:
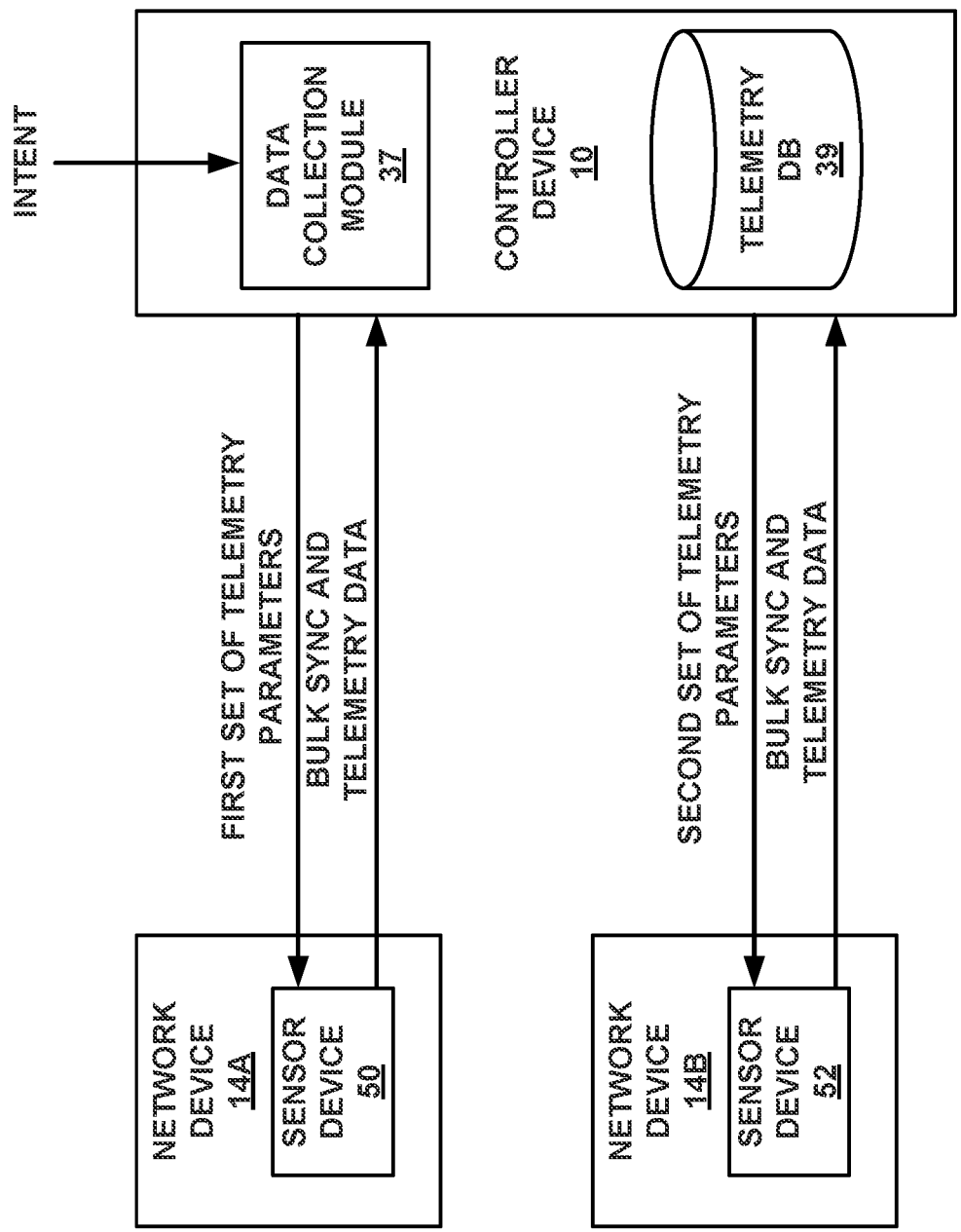
FIG. 3 is a conceptual diagram illustrating item potency in accordance with the techniques of this disclosure.

FIG. 3 is a conceptual diagram illustrating item potency in accordance with the techniques of this disclosure. FIG. 3 is discussed with FIGS. 1-2 for example purposes only. In the example of FIG. 3, network device 14A includes sensor device 50 and network device 14B includes sensor device 52.

In this example, data collection module 37 may utilize an intent provided by administrator 12, e.g. a graph model that describes the intended network topology, to preprocess telemetry data collected from network devices. For example, data collection module 37 may determine a filtered set of telemetry parameters from the plurality of telemetry parameters based on the graph model. For instance, in response to determining that the graph model stored in configuration database 40 may indicate that 32 interfaces are intended to be operational out of 132, data collection module 37 may cause sensor devices 50, 52 to stream telemetry data for only the 32 interfaces intended to be operational. In this way, data collection module 37 may help to ensure that telemetry data relevant to the intent provided by administrator 12 is stored in a database, which may help to reduce a processing and storage burden on controller device 10.

Figure 4:
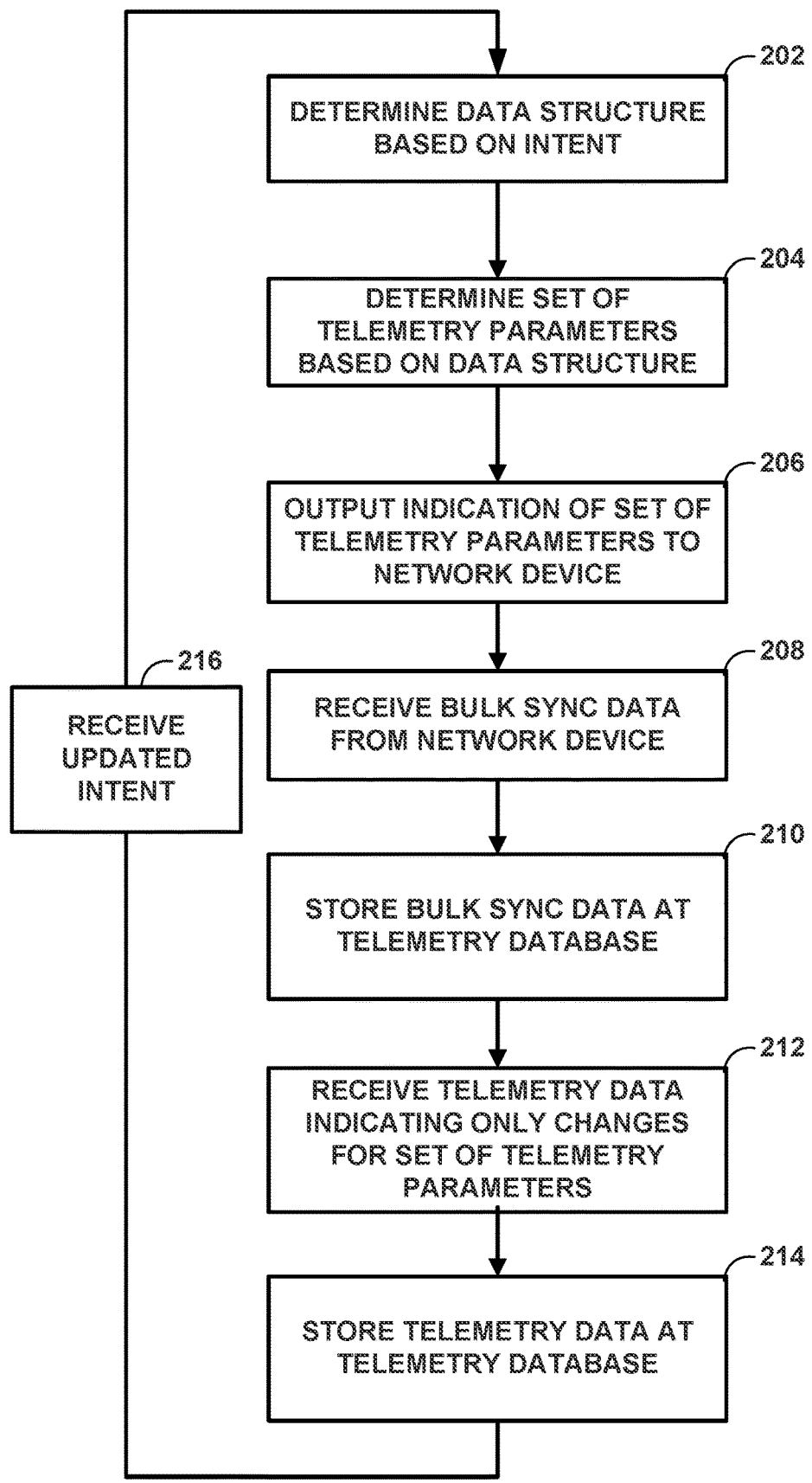
FIG. 4 is a flowchart illustrating an example process for storing telemetry data based on an intent received from an administrator according to techniques of this disclosure.

FIG. 4 is a flowchart illustrating an example process for storing telemetry data based on an intent received from an administrator according to techniques of this disclosure. FIG. 4 is discussed with FIGS. 1-3 for example purposes only.

Controller device 10 may determine a data structure based on an intent (202). The data structure may include a plurality of vertices and a plurality of edges, each vertex of the plurality of vertices representing a respective network device of the plurality of network devices or a respective stateless intent of a plurality of stateless intents, and the plurality of edges defining relationships between the plurality of vertices. For example, the data structure may include a graph model.

Controller device 10 may determine a set of telemetry parameters based on the data structure (204). Controller device 10 may receive the intent from administrator 12. For example, controller device 10 may determine that a graph model stored in configuration database 40 indicates that 32 interfaces are intended to be operational out of 132. In this example, controller device may select the 32 operational interfaces to be part of the set of telemetry parameters and omit the remaining interfaces from the set of telemetry parameters. Controller device 10 may output an indication of the set of telemetry parameters to network devices 14 (206).

Controller device 10 may receive bulk sync data from sensor device 50 for network device 14A (208). For example, controller device 10 may receive an indication of each state of each telemetry parameter associated with network device 14 from sensor device 50. For instance, controller device 10 may receive an indication of each state of each operational interface of network device 14A. In some instances, controller device 10 may receive an indication of route of a table of routes operational at network device 14A. Controller device 10 may store the bulk sync data at telemetry database 39 (210). Controller device 10 may determine a first snapshot based on the bulk sync data. For example, controller device 10 may set the first snapshot as the bulk sync data.

Controller device 10 may receive telemetry data indicating only changes for the set of telemetry parameters from network device 14A (212). For example, controller device 10 may receive an indication of each state of each telemetry parameter associated with network device 14 and that has changed from the bulk sync data from sensor 50. For instance, controller device 10 may receive an indication of only states of operational interface of network device 14A that have changed from the bulk sync data. In some instances, controller device 10 may receive an indication of only routes of a table of routes operational at network device 14A that have been added and/or removed. Controller device 10 may store the telemetry data at telemetry database 39 (214).

Controller device 10 may receive, after outputting the indication of the set of telemetry parameters to the plurality of network devices (after step 214), updated intent (216) and the process repeats. For example, controller device 10 may determine an updated data structure based on the updated intent. In this example, controller device 10 may determine an updated set of telemetry parameters based on the data structure. Controller device 10 may output an indication of the updated set of telemetry parameters to network devices 14 (e.g., sensor devices 50, 52).

Figure 5:
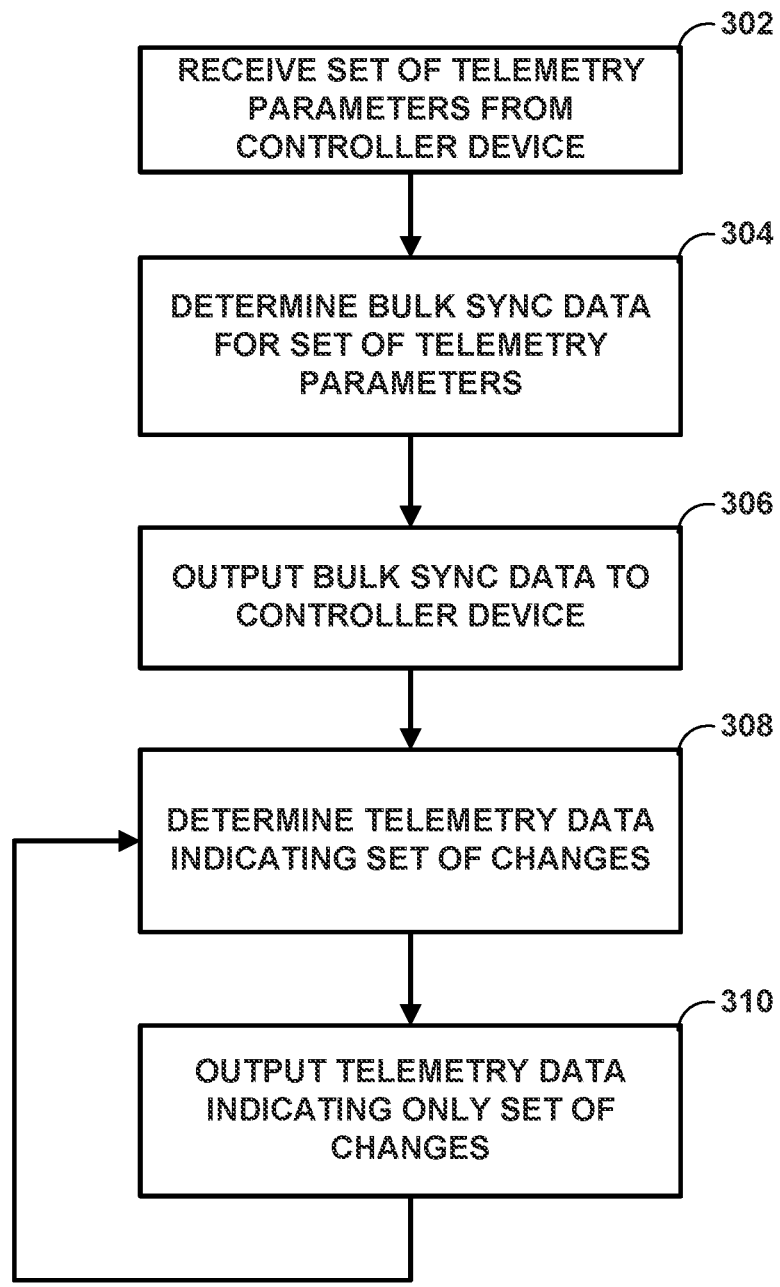
FIG. 5 is a flowchart illustrating an example process for compressing telemetry data based on an intent received from an administrator according to techniques of this disclosure.

FIG. 5 is a flowchart illustrating an example process for compressing telemetry data based on an intent received from an administrator according to techniques of this disclosure. FIG. 5 is discussed with FIGS. 1-4 for example purposes only.

Sensor device 50 may receive a set of telemetry parameters from controller device 10 (302). For example, sensor device 50 may receive a set of 32 interfaces that are indicated as operational from controller device 10. Sensor device 50 may determine bulk sync data for the set of telemetry parameters (304) and output the bulk sync data to controller device 10 (306). For example, sensor device 50 may output an indication of each state of each telemetry parameter associated with network device 14 to controller device 10. For instance, sensor device 50 may output an indication of each state of each operational interface of network device 14A. In some instances, sensor device 50 may output an indication of route of a table of routes operational at network device 14A.

Sensor device 50 may determine telemetry data indicating a set of changes of the set of telemetry parameters (308) and output the telemetry data indicating only set of changes to controller device 10 (310). Sensor device 50 may generate telemetry data to indicate data for each telemetry parameter that changes and to refrain from including data for each telemetry parameter that does not change. For example, sensor device 50 may output an indication of each state of each telemetry parameter associated with network device 14 and that has changed from the bulk sync data to controller device 10. For instance, sensor device 50 may output an indication of only states of operational interface of network device 14A that have changed from the bulk sync data. In some instances, sensor device 50 may output an indication of only routes of a table of routes operational at network device 14A that have been added and/or removed. As shown, the process of steps 308-310 may repeat for each change of the telemetry data.

Figure 6:
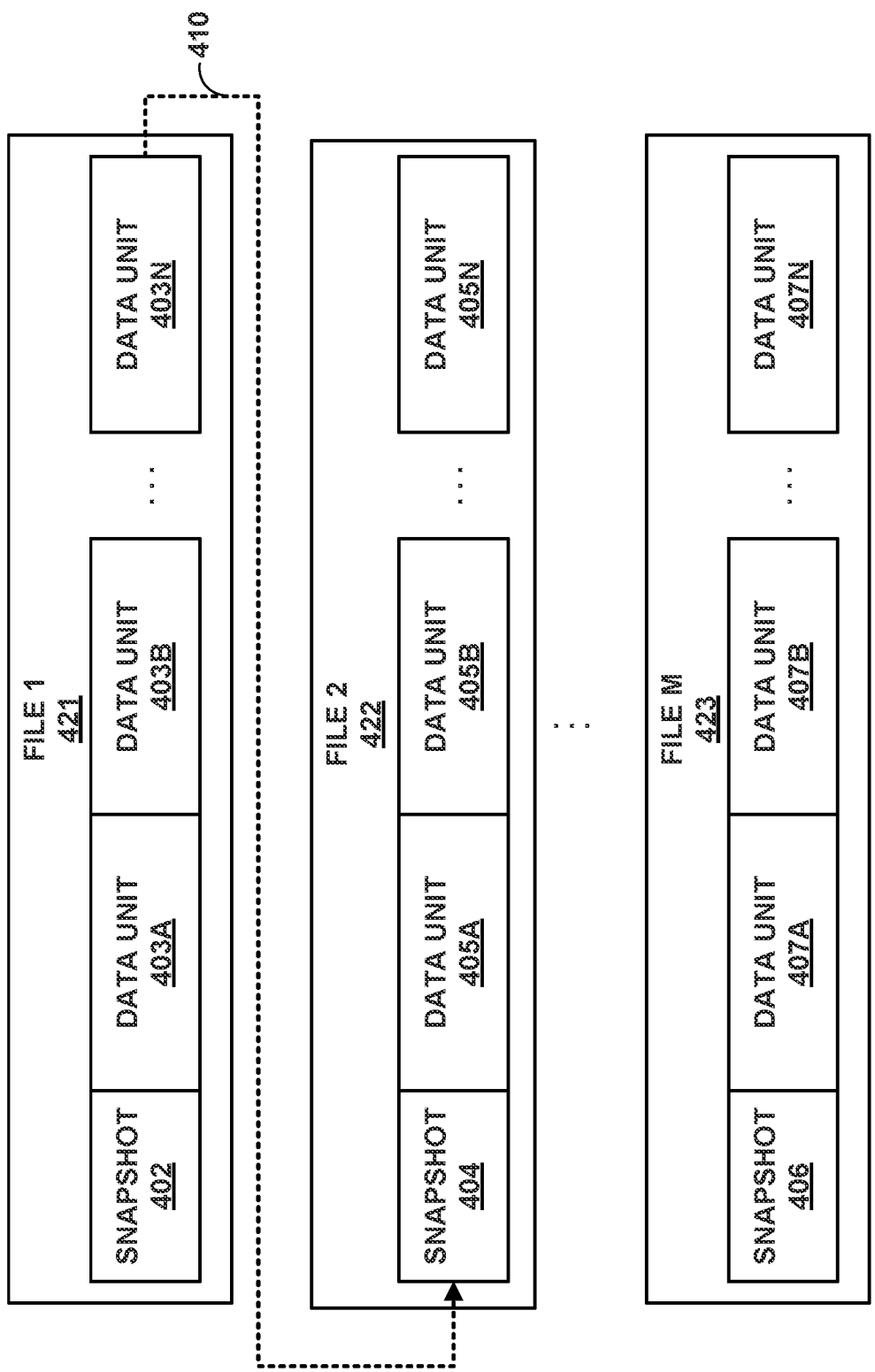
FIG. 6 is a conceptual diagram illustrating an example of storing telemetry data in data units of files in accordance with the techniques of this disclosure.

FIG. 6 is a conceptual diagram illustrating an example of storing telemetry data in data units of files in accordance with the techniques of this disclosure. FIG. 6 is discussed with FIGS. 1-5 for example purposes only. In the example of FIG. 6, controller device 10 may generate a first file 421 to include snapshot 402 and data units 403A-403N, where N is a positive integer. Snapshot 402 may be part of first file 421, part of data unit 403A, or part of another data unit of first file 421. In this example, controller device 10 may generate a second file 422 to include snapshot 404 and data units 405A-405N, where N is a positive integer. Similarly, snapshot 404 may be part of second file 422, part of data unit 405A, or part of another data unit of second file 422. Controller device 10 may generate 'M' number of files in this manner. While each file of FIG. 6 is illustrated as including 'N' number of data units, each file may include a different or a same number of data units. For example, data unit 403A may be larger than data units 405A, which may result in second file 422 including more data units than first file 421. Each of data units 403A-403N (collectively, data units 403), 405A-405N (collectively, data units 405), and 407A-407N (collectively, data units 407) may be associated (e.g., assigned) a respective time range. For example, data unit 403A may be assigned a first time range (e.g., 1 AM to 2 AM for a first date), data unit 403B may be assigned a second time range (e.g., 2 AM to 3 AM for the first date), and data unit 403N may be assigned a third time range (e.g., 5 AM to 6 AM for the first date), and so forth.

Controller device 10 may store first telemetry data in a final data unit of first file 421. For example, controller device 10 may store first telemetry data in data unit 403N of first file 421. In this example, controller device 10 may determine that first file 421 satisfies a rotation criteria. For instance, controller device 10 may determine that first file comprises a number of bits that exceeds a threshold value. In this example, controller device 10 may allocate (410) second file 422 to include second telemetry data. Controller device 10 may specify a time duration (e.g. 12 hours), in addition, or alternatively, to a file size to trigger a rotation. For example, controller device 10 may rotate (e.g., allocate a new file) when the file size exceeds the threshold value (e.g., 10 M bytes) or when a time duration exceeds a time threshold (e.g., 12 hours), whichever comes first.

In accordance with the techniques of the disclosure, controller device 10 may generate a snapshot 404 indicating a complete state of first file 421 and store snapshot 404 in second file 422. For example, controller device 10 may store snapshot 404 in second file 422 and store the second telemetry data in an initial data unit of second file 422 (e.g., data unit 405A). In this way, a reader of telemetry database 39 may restore a system state from snapshot 404 and apply subsequent logged events stored by data units 405A-405N to update the state incrementally without relying on first file 421, which may be deleted according to a retention criteria.

Controller device 10 may determine a complete state of telemetry parameters for a time range (e.g., using a time stamp received from administrator 12) based on snapshot 404 stored in second file 422 and the second telemetry data stored in second file 422. For example, controller device 10 may reconstruct the complete state by modifying snapshot 404 using set of changes for telemetry parameters indicated by the second telemetry data of one or more of data units 405. For example, if data unit 405B is associated with a time range of 3 PM to 4 PM, and the administrator requests a complete state at 4 PM, controller device 10 may modify snapshot 404 using set of changes for telemetry parameters indicated by telemetry data of data units 405A-405B.

Figure 7:
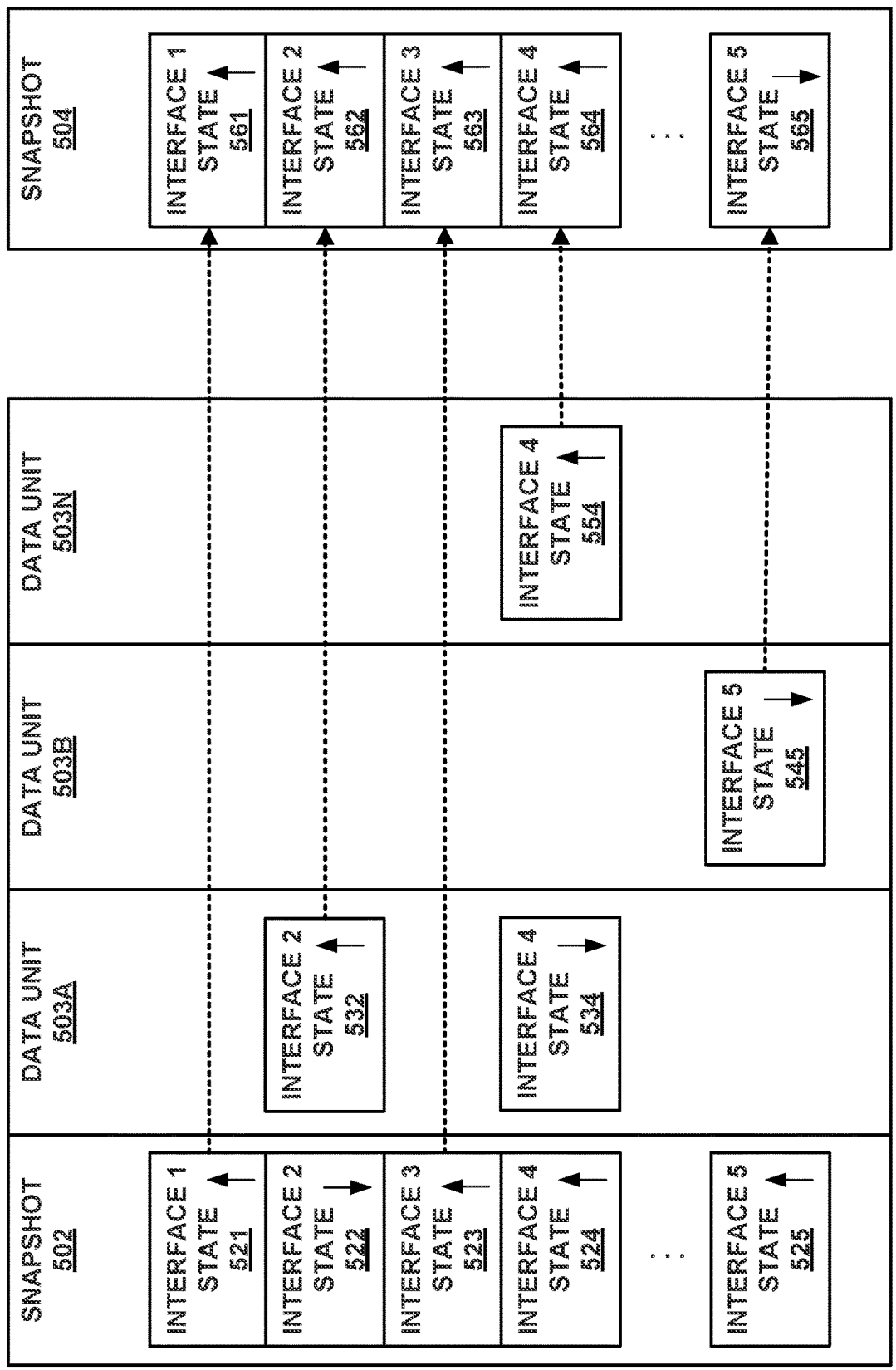
FIG. 7 is a conceptual diagram illustrating an example of storing telemetry data for interface states in data units of files in accordance with the techniques of this disclosure.

FIG. 7 is a conceptual diagram illustrating an example of storing telemetry data for interface states in data units of files in accordance with the techniques of this disclosure. FIG. 7 is discussed with FIGS. 1-6 for example purposes only. In the example of FIG. 7, data units 503A-503N (collectively, data units 503) store telemetry data that includes event driven telemetry data. More specifically, data units 503 store interface state data. For example, snapshot 502 stores interface states 521-525 (e.g., a complete state of interfaces).

Data units 503 may each store telemetry data that indicates an interface state changing from up to down or from down to up and does not indicate interface states that remain up or remain down. For example, data unit 503A stores a change of interface states 532 and 534, data unit 503B stores a change of interface state 535, and data unit 503N stores a change of interface state 554. For example, interface state 532 indicates that a second interface changes from down to up, interface state 534 indicates that a fourth interface changes from up to down, interface state 545 indicates that a fifth interface changes from up to down, and interface state 554 indicates that a fifth interface changes from down to up.

Controller device 10 may modify the snapshot 502 using set of changes for telemetry parameters indicated data units 503. For example, controller device 10 may determine, for each respective interface state, an indication of whether the respective interface state is up or down at the end of a first time range associated with data unit 503N. For example, controller device 10 may generate snapshot 504 with interface state 561 for interface 1 being up when interface state 521 of snapshot 502 indicates interface 1 being up and data units 503A-503N do not include any changes for interface 1. In this example, controller device 10 may generate snapshot 504 with interface state 562 for interface 2 being up when interface state 522 of snapshot 502 indicates interface 2 being down, and interface state 532 of data unit 503 indicates interface 2 being up, and data units 503B-503N do not include any changes for interface 2.

Figure 8:
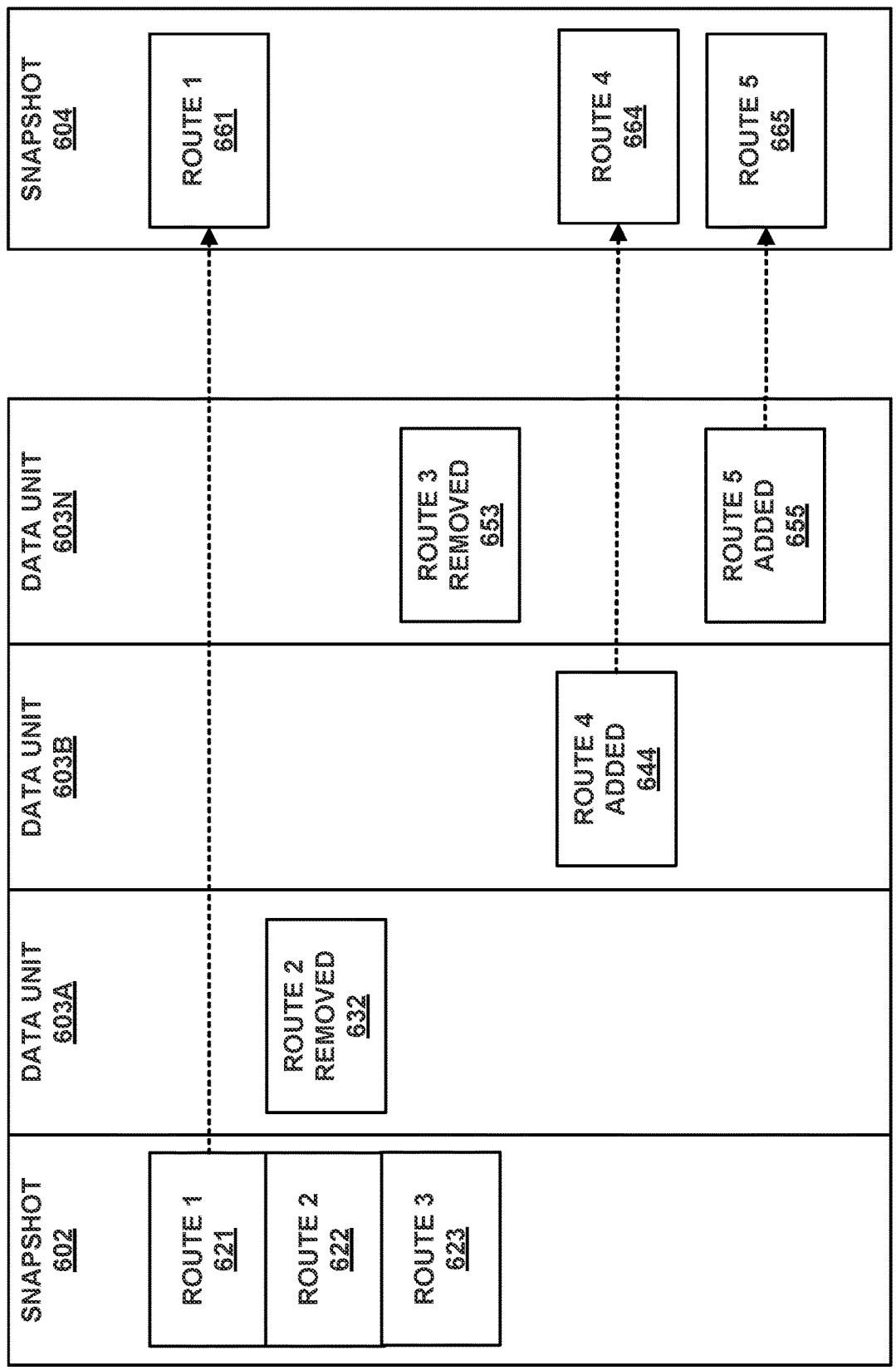
FIG. 8 is a conceptual diagram illustrating an example of storing telemetry data for Ethernet virtual private network (EVPN) routes in data units of files in accordance with the techniques of this disclosure.

FIG. 8 is a conceptual diagram illustrating an example of storing telemetry data for Ethernet virtual private network (EVPN) routes in data units of files in accordance with the techniques of this disclosure. FIG. 8 is discussed with FIGS. 1-7 for example purposes only. In the example of FIG. 8, data units 603A-603N (collectively, data units 603) store telemetry data that includes event driven telemetry data. More specifically, data units 603 store routes (e.g., EVPN routes) for a route table (e.g., an EVPN routing table). For example, snapshot 602 stores routes 621-623 (e.g., a complete state of routes).

Data units 603 may each store telemetry data that indicates an addition or removal of a route and does not indicate existing routes. For example, data unit 603A stores a change 632 indicating that route 2 has been removed, data unit 603B stores a change 644 indicating that route 4 has been added, and data unit 603N stores a change 653 indicating that route 3 has been removed and a change 655 indicating that route 5 has been added. Controller device 10 may modify the snapshot 602 using set of changes for telemetry parameters indicated data units 603. For example, controller device 10 may determine, for each respective interface state, an indication of routing information at the end of a first time range associated with data unit 503N. For instance, controller device 10 may generate snapshot 604 with routes 661, 664, and 665.

Figure 9:
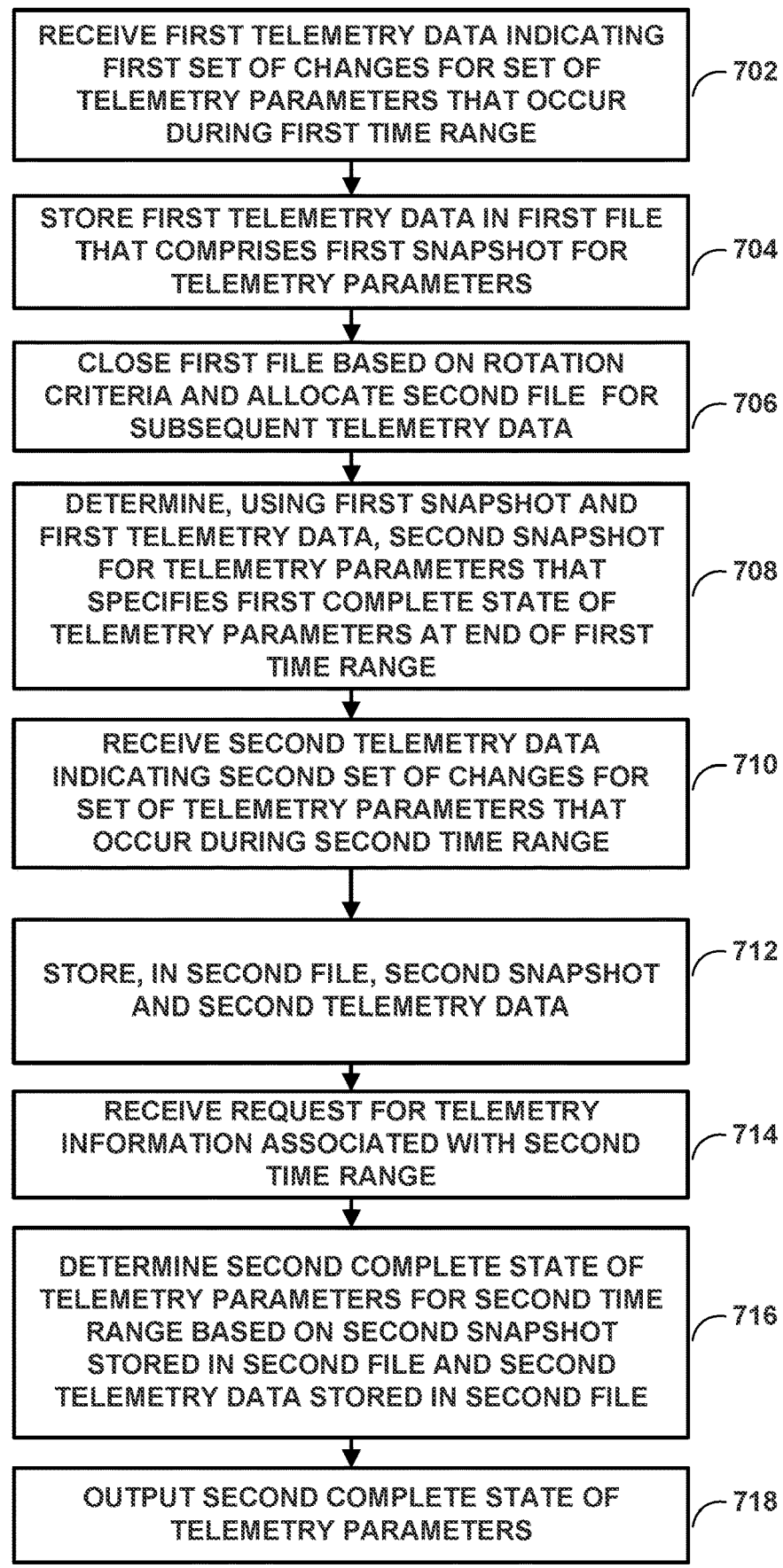
FIG. 9 is a flowchart illustrating an example process for storing telemetry data in data units of files based on an intent received from an administrator according to techniques of this disclosure.

FIG. 9 is a flowchart illustrating an example process for storing telemetry data in data units of files based on an intent received from an administrator according to techniques of this disclosure. FIG. 9 is discussed with FIGS. 1-8 for example purposes only.

Controller device 10 may receive, from a set of sensor devices for network devices 14, first telemetry data indicating a first set of changes for telemetry parameters that occur during a first time range (702). For example, controller device 10 may receive first telemetry data indicating an interface state has changed from up to down or down to up. In some examples, controller device 10 may receive first telemetry data indicating a route has been removed or added. Controller device 10 may store the first telemetry data in a first file and/or a first set of data units that comprises a first snapshot for the set of telemetry parameters for network devices 14 (704). For example, controller device 10 may store the first telemetry data in data unit 403N of FIG. 4, which stores snapshot 402. Controller device 10 may close the first file based on rotation criteria and allocate a second file for subsequent telemetry data (706). For example, controller device 10 may close first file 421 when a bit size of first file 421 exceeds a threshold and generate second file 422.

Controller device 10 may determine, using the first snapshot and the first telemetry data, a second snapshot for the set of telemetry parameters that specifies a first complete state of the telemetry parameters at an end of the first time range (708). For example, controller device 10 may determine, using snapshot 402, the telemetry data stored by data unit 403N (or all telemetry data stored by data units 403), snapshot 404. Controller device 10 may receive second telemetry data indicating a second set of changes for the set of telemetry parameters that occur during a second time range (710). For example, controller device 10 may receive the second telemetry data from sensor 50. Controller device 10 may store, in a second file and/or a second set of data units, the second snapshot and second telemetry data (712). For example, controller device 10 may store in second file 422, snapshot 404 and second telemetry data in data unit 405A.

Controller device 10 may receive a request for telemetry information associated with the second time range (714). For example, controller device 10 may receive the request for telemetry information from administrator 12 requesting telemetry information for a time stamp that occurs during the second time range. Controller device 10 may determine a second complete state of the telemetry parameters for the time range based on the second snapshot stored in the second file and the second telemetry data stored in the second file (716). For example, controller device 10 may modify snapshot 404 using set of changes for telemetry parameters indicated by the second telemetry data of one or more of data units 405. Controller device 10 may output the second complete state of the telemetry parameters (718). For example, controller device 10 may output the second complete state of the telemetry parameters comprises outputting an indication of the second complete state of the telemetry parameters to administrator 12.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method for managing a plurality of network devices of a network, the method comprising:
   selecting, by one or more processors, a plurality of telemetry parameters from a set of telemetry parameters based on a data structure, the data structure comprising a plurality of vertices and a plurality of edges, each vertex of the plurality of vertices representing a respective network device of the plurality of network devices or a respective stateless intent of a plurality of stateless intents, and the plurality of edges defining relationships between the plurality of vertices, wherein the plurality of telemetry parameters omits at least one telemetry parameter of the set of telemetry parameters;
   outputting, by the one or more processors, an indication of the plurality of telemetry parameters to the plurality of network devices;
   receiving, by the one or more processors, from a set of sensor devices for the plurality of network devices, first telemetry data indicating a first set of changes for the plurality of telemetry parameters that occur during a first time range;
   storing, by the one or more processors, the first telemetry data and a first snapshot for the plurality of telemetry parameters for the plurality of network devices;
   determining, by the one or more processors, using the first snapshot and the first telemetry data, a second snapshot for the plurality of telemetry parameters that specifies a first complete state of the plurality of telemetry parameters at an end of the first time range;
   storing, by the one or more processors, the second snapshot and second telemetry data indicating a second set of changes for the plurality of telemetry parameters that occur during a second time range;
   in response to a request for telemetry information for a specified time that occurs during the second time range, determining, by the one or more processors and using the specified time, a second complete state of the plurality of telemetry parameters based on the second snapshot and the second telemetry data, wherein the second complete state indicates a state for each telemetry parameter of the plurality of telemetry parameters at the specified time; and
   outputting, by the one or more processors, the second complete state of the plurality of telemetry parameters.

2. The method of claim 1, wherein determining the second snapshot comprises modifying the first snapshot using the first set of changes for the plurality of telemetry parameters indicated by the first telemetry data.

3. The method of claim 1, wherein determining the second complete state of the plurality of telemetry parameters comprises modifying the second snapshot using the second set of changes for the plurality of telemetry parameters indicated by the second telemetry data.

4. The method of claim 1, wherein the first telemetry data comprises event driven telemetry data.

5. The method of claim 1,
wherein the plurality of telemetry parameters comprise a plurality of interface states;
wherein determining the determining, for each respective interface state of the plurality of interface states, an indication of whether the respective interface state is up or down at an end of the first time range; and
wherein the second telemetry data indicates a first interface state of the plurality of interface states changing from up to down or from down to up and does not indicate a second interface state of the plurality of interface states that remains up or remains down.

6. The method of claim 1,
wherein the plurality of telemetry parameters comprise a plurality of routes for a routing table;
wherein determining the second snapshot comprises determining, for each respective route of the plurality of routes, an indication of routing information at an end of the first time range; and
wherein the second telemetry data indicates a removal or an addition of a route from the routing table.

7. The method of claim 1, further comprising determining, by the one or more processors, the data structure based on an intent.

8. The method of claim 7, further comprising receiving the intent from a network administrator.

9. The method of claim 1, wherein the data structure comprises a graph model.

10. The method of claim 9, wherein the graph model is a first graph model, the method further comprising:
determining, by the one or more processors, after outputting the indication of the plurality of telemetry parameters to the plurality of network devices, a second graph model based on an updated intent; and
determining, by the one or more processors, an updated plurality of telemetry parameters based on the second graph model; and
outputting, by the one or more processors, an indication of the updated plurality of telemetry parameters to the plurality of network devices.

11. The method of claim 1, wherein the plurality of network devices are configured to generate the first telemetry data to indicate data for each telemetry parameter that changes during the first time range and to refrain from including data for each telemetry parameter that does not change during the first time range.

12. The method of claim 1, wherein outputting the second complete state of the plurality of telemetry parameters comprises outputting an indication of the second complete state of the plurality of telemetry parameters to a network administrator.

13. The method of claim 1, further comprising:
receiving, by the one or more processors, from a sensor device for a network device of the plurality of network devices, bulk sync data; and
determining, by the one or more processors, the first snapshot based on the bulk sync data.

14. The method of claim 1, wherein storing the first telemetry data comprises storing the first telemetry data in a final data unit of a first file.

15. The method of claim 14, wherein storing the second snapshot and the second telemetry data comprises storing the second snapshot and second telemetry data in an initial data unit of a second file.

16. A system comprising:
a memory;
one or more processors coupled to the memory; and
wherein the memory stores instructions that, when executed, cause the one or more processors to:
select a plurality of telemetry parameters from a set of telemetry parameters based on a data structure, the data structure comprising a plurality of vertices and a plurality of edges, each vertex of the plurality of vertices representing a respective network device of a plurality of network devices or a respective stateless intent of a plurality of stateless intents, and the plurality of edges defining relationships between the plurality of vertices, wherein the plurality of telemetry parameters omits at least one telemetry parameter of the set of telemetry parameters;
output an indication of the plurality of telemetry parameters to the plurality of network devices;
receive, from a set of sensor devices for the plurality of network devices, first telemetry data indicating a first set of changes for the plurality of telemetry parameters that occur during a first time range;
store the first telemetry data and a first snapshot for the plurality of telemetry parameters for the plurality of network devices;
determine, using the first snapshot and the first telemetry data, a second snapshot for the plurality of telemetry parameters that specifies a first complete state of the plurality of telemetry parameters at an end of the first time range;
store the second snapshot and second telemetry data indicating a second set of changes for the plurality of telemetry parameters that occur during a second time range;
in response to a request for telemetry information for a specified time that occurs during the second time range, determine, using the specified time, a second complete state of the plurality of telemetry parameters for the second time range based on the second snapshot and the second telemetry data, wherein the second complete state indicates a state for each telemetry parameter of the plurality of telemetry parameters at the specified time; and
output the second complete state of the plurality of telemetry parameters.

17. The system of claim 16, wherein, to determine the second snapshot, the one or more processors are configured to modify the first snapshot using the first set of changes for the plurality of telemetry parameters indicated by the first telemetry data.

18. The system of claim 16, wherein, to determine the second complete state of the plurality of telemetry parameters, the one or more processors are configured to modify the second snapshot using the second set of changes for the plurality of telemetry parameters indicated by the second telemetry data.

19. A non-transitory computer-readable storage medium having stored thereon instructions that, when executed, cause one or more processors of a system that manages a plurality of network devices to:
select a plurality of telemetry parameters from a set of telemetry parameters based on a data structure, the data structure comprising a plurality of vertices and a plurality of edges, each vertex of the plurality of vertices representing a respective network device of a plurality of network devices or a respective stateless intent of a plurality of stateless intents, and the plurality of edges defining relationships between the plurality of vertices, wherein the plurality of telemetry parameters omits at least one telemetry parameter of the set of telemetry parameters;

output an indication of the plurality of telemetry parameters to the plurality of network devices;

receive, from a set of sensor devices for the plurality of network devices, first telemetry data indicating a first set of changes for the plurality of telemetry parameters that occur during a first time range;

store the first telemetry data and a first snapshot for the plurality of telemetry parameters for the plurality of network devices;

determine, using the first snapshot and the first telemetry data, a second snapshot for the plurality of telemetry parameters that specifies a first complete state of the plurality of telemetry parameters at an end of the first time range;

store the second snapshot and second telemetry data indicating a second set of changes for the plurality of telemetry parameters that occur during a second time range;

in response to a request for telemetry information for a specified time that occurs during the second time range, determine, using the specified time, a second complete state of the plurality of telemetry parameters for the second time range based on the second snapshot and the second telemetry data, wherein the second complete state indicates a state for each telemetry parameter of the plurality of telemetry parameters at the specified time; and output the second complete state of the plurality of telemetry parameters.

20. The system of claim 16, wherein, to determine the second complete state of the plurality of telemetry parameters, the one or more processors are configured to modify the second snapshot using the second set of changes for the plurality of telemetry parameters indicated by the second telemetry data.

* * * * *